(12) United States Patent
Palangie et al.

(10) Patent No.: US 12,743,857 B2
(45) **Date of Patent: *Sep. 22, 2026**

(54) PRESENTING AN ENVIRONMENT BASED ON USER MOVEMENT

(71) Applicant: Apple Inc., Cupertino, CA (US)

(72) Inventors: Alexis Palangie, Palo Alto, CA (US); Aaron Mackay Burns, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/385,851

(22) Filed: Oct. 31, 2023

(65) Prior Publication Data

US 2024/0062487 A1 Feb. 22, 2024

Related U.S. Application Data

(63) Continuation of application No. 17/002,225, filed on Aug. 25, 2020, now Pat. No. 11,842,449.

(Continued)

(51) Int. Cl.

*G06T 19/00* (2011.01)
*G06F 3/01* (2006.01)

(52) U.S. Cl.

CPC ............ *G06T 19/006* (2013.01); *G06F 3/011* (2013.01); *G06F 3/017* (2013.01)

(58) Field of Classification Search

CPC ..... G06T 19/003; G06T 19/006; G06T 19/20; G06T 15/205; G06T 7/74; G06T 2215/16; G06T 2210/21; G06F 3/011; G06F 3/017

See application file for complete search history.

(56) References Cited

U.S. PATENT DOCUMENTS 5,900,849 A 5/1999 Gallery
9,754,167 B1 9/2017 Holz et al.

(Continued)

FOREIGN PATENT DOCUMENTS

CN 106295581 A 1/2017
CN 106575155 A 4/2017

(Continued)

OTHER PUBLICATIONS

Non-Final Office Action received for U.S. Appl. No. 17/479,489, mailed on Mar. 2, 2023, 30 pages.

(Continued)

*Primary Examiner* — Chante E Harrison
(74) *Attorney, Agent, or Firm* — YHE Law LLP

(57) ABSTRACT

In an exemplary process, a computer-generated reality environment comprising a virtual object is presented and user movement that occurs in a physical environment is detected. In response to determining that the detected user movement is toward the virtual object and that the virtual object obstructs a real object from the physical environment, a determination is made whether the detected user movement is directed to the virtual object or the real object. In accordance with a determination that the detected user movement is directed to the real object, a visual appearance of the virtual object is modified, where modifying the visual appearance of the virtual object comprises displaying presenting at least a portion of the real object. In accordance with a determination that the detected user movement is directed to the virtual object, the presentation of the virtual object is maintained to obstruct the real object.

22 Claims, 8 Drawing Sheets

Related U.S. Application Data

(60) Provisional application No. 62/906,667, filed on Sep. 26, 2019.

(56) References Cited

U.S. PATENT DOCUMENTS

| | | | | |
|---|---|---|---|---|
| 11,868,517 | B2 * | 1/2024 | Ishihara | G06F 3/147 |
| 2012/0092328 | A1 | 4/2012 | Flaks et al. | |
| 2013/0031511 | A1 | 1/2013 | Adachi | |
| 2013/0293386 | A1 | 11/2013 | Raniere | |
| 2013/0335301 | A1 | 12/2013 | Wong et al. | |
| 2014/0046505 | A1 | 2/2014 | Sakoda et al. | |
| 2014/0267248 | A1 | 9/2014 | Zou et al. | |
| 2014/0364212 | A1 | 12/2014 | Osman et al. | |
| 2015/0277119 | A1 | 10/2015 | Wong et al. | |
| 2016/0027212 | A1 | 1/2016 | Da Veiga et al. | |
| 2016/0027215 | A1 | 1/2016 | Burns et al. | |
| 2016/0217616 | A1 | 7/2016 | Kraver | |
| 2016/0379413 | A1 * | 12/2016 | Yamamoto | G09G 5/00 345/427 |
| 2017/0061696 | A1 | 3/2017 | Li et al. | |
| 2017/0169616 | A1 | 6/2017 | Wiley et al. | |
| 2017/0206692 | A1 | 7/2017 | Sheaffer et al. | |
| 2017/0287215 | A1 * | 10/2017 | Lalonde | G06F 3/012 |
| 2017/0337750 | A1 | 11/2017 | McKenzie et al. | |
| 2017/0372499 | A1 | 12/2017 | Lalonde | |
| 2018/0122043 | A1 | 5/2018 | Energin et al. | |
| 2018/0165883 | A1 | 6/2018 | Osotio et al. | |
| 2018/0342103 | A1 | 11/2018 | Schwarz et al. | |
| 2019/0213793 | A1 | 7/2019 | Balan et al. | |
| 2019/0333278 | A1 | 10/2019 | Palangie et al. | |
| 2020/0258278 | A1 | 8/2020 | Mirhosseini et al. | |
| 2021/0018977 | A1 | 1/2021 | Baumbach et al. | |
| 2021/0097766 | A1 | 4/2021 | Palangie et al. | |
| 2021/0165484 | A1 * | 6/2021 | Suguhara | G09G 5/00 |
| 2022/0108508 | A1 | 4/2022 | Mirhosseini et al. | |
| 2024/0135653 | A1 * | 4/2024 | Danielson | G06T 7/246 |
| 2024/0152245 | A1 * | 5/2024 | Broughton | G06F 3/013 |

FOREIGN PATENT DOCUMENTS

| | | | |
|---|---|---|---|
| CN | 107850936 | A | 3/2018 |
| CN | 108885488 | A | 11/2018 |
| JP | 10-504917 | A | 5/1998 |
| JP | 2011-128838 | A | 6/2011 |
| JP | 2015-191124 | A | 11/2015 |
| JP | 2016-532178 | A | 10/2016 |
| JP | 2019-516180 | A | 6/2019 |
| KR | 10-2017-0081225 | A | 7/2017 |
| WO | 2013/052855 | A2 | 4/2013 |
| WO | 2014/197337 | A1 | 12/2014 |
| WO | 2016/073783 | A1 | 5/2016 |
| WO | 2018/004735 | A1 | 1/2018 |

OTHER PUBLICATIONS

Notice of Allowance received for Chinese Patent Application No. 201880063520.30, mailed on Apr. 12, 2022, 2 pages (1 page of English Translation and 1 page of Official Copy).

Notice of Allowance received for Korean Patent Application No. 10-2020-7008974, mailed on Oct. 12, 2022, 4 pages (1 pages of English Translation and 3 pages of Official Copy).

Notice of Allowance received for U.S. Appl. No. 17/479,489, mailed on Apr. 18, 2023, 11 pages.

Office Action received for European Patent Application No. 18793511.9, mailed on Jul. 6, 2023, 7 pages.

Office Action received for Korean Patent Application No. 10-2020-7008974, mailed on Jun. 21, 2022, 6 pages (3 pages of English Translation and 3 pages of Official Copy).

Applicant-Initiated Interview Summary received for U.S. Appl. No. 16/833,395, mailed on Mar. 1, 2021, 5 pages.

Applicant-Initiated Interview Summary received for U.S. Appl. No. 17/002,225, mailed on Feb. 25, 2022, 2 pages.

Applicant-Initiated Interview Summary received for U.S. Appl. No. 17/002,225, mailed on Jun. 29, 2021, 2 pages.

Applicant-Initiated Interview Summary received for U.S. Appl. No. 17/002,225, mailed on Oct. 25, 2021, 2 pages.

Decision on Appeal received for U.S. Appl. No. 17/002,225, mailed on Aug. 30, 2023, 10 pages.

Decision to Grant received for Japanese Patent Application No. 2020-517779, mailed on Jan. 19, 2022, 7 pages.

Examiner's Answer to Appeal Brief received for U.S. Appl. No. 17/002,225, mailed on Feb. 1, 2023, 27 pages.

Final Office Action received for U.S. Appl. No. 17/002,225, mailed on Aug. 6, 2021, 19 pages.

Final Office Action received for U.S. Appl. No. 17/002,225, mailed on May 2, 2022, 23 pages.

International Preliminary Report on Patentability received for PCT Patent Application No. PCT/US2018/052719, mailed on Apr. 9, 2020, 10 pages.

International Search Report and Written Opinion Received for PCT Application No. PCT/US2018/052719, mailed on Jan. 2, 2019, 11 pages.

Non-Final Office Action received for U.S. Appl. No. 16/833,395, mailed on Oct. 16, 2020, 21 pages.

Non-Final Office Action received for U.S. Appl. No. 17/002,225, mailed on Dec. 8, 2021, 21 pages.

Non-Final Office Action received for U.S. Appl. No. 17/002,225, mailed on Mar. 12, 2021, 17 pages.

Notice of Allowance received for U.S. Appl. No. 16/833,395, mailed on Jun. 23, 2021, 8 pages.

Notice of Allowance received for U.S. Appl. No. 16/833,395, mailed on May 19, 2021, 11 pages.

Notice of Allowance received for U.S. Appl. No. 17/002,225, mailed on Sep. 7, 2023, 7 pages.

Office Action received for Chinese Patent Application No. 201880063520.3, mailed on Aug. 26, 2021, 14 pages.

Office Action received for European Patent Application No. 18793511.9, mailed on Dec. 13, 2021, 7 pages.

Office Action received for Japanese Patent Application No. 2020-517779, mailed on May 10, 2021, 7 pages.

Office Action received for Korean Patent Application No. 10-2020-7008974, mailed on Nov. 29, 2021, 8 pages.

Record of Oral Hearing received for U.S. Appl. No. 17/002,225, mailed on Sep. 12, 2023, 18 pages.

Intention to Grant received for European Patent Application No. 18793511.9, mailed on Jun. 5, 2024, 8 pages.

Board Decision received for Chinese Patent Application No. 202010889736.4, mailed on May 27, 2025, 2 pages (1 page of English Translation and 1 page of Official Copy).

Decision to Grant received for European Patent Application No. 18793511.9, mailed on Oct. 17, 2024, 2 pages.

Extended European Search Report received for European Patent Application No. 24207710.5, mailed on Dec. 13, 2024, 12 pages.

Jie Zhu, "A Brief Introduction to Augmented Reality Technology", Shanghai Institute of Design, China Academy of Art, Shanghai 201203, China, Jan. 2014, pp. 149-152 (Official Copy only) (See Communication Under Rule 37 CFR § 1.98(a) (3)).

Notice of Allowance received for Chinese Patent Application No. 202010889736.4, mailed on Nov. 3, 2025, 2 pages (1 page of English Translation and 1 page of Official Copy).

Office Action received for Chinese Patent Application No. 202010889736.4, mailed on Jan. 27, 2025, 35 pages (7 pages of English Translation and 28 pages of Official Copy).

Office Action received for Chinese Patent Application No. 202010889736.4, mailed on Jul. 17, 2025, 10 pages (5 pages of English Translation and 5 pages of Official Copy).

Office Action received for Chinese Patent Application No. 202010889736.4, mailed on Jun. 6, 2024, 39 pages (9 pages of English Translation and 30 pages of Official Copy).

Office Action received for Chinese Patent Application No. 202010889736.4, mailed on Nov. 13, 2024, 37 pages (8 pages of English Translation and 29 pages of Official Copy).

Yu et al., "Research on Occlusion Judgment Method of Virtual and Real Objects in Augmented Reality Environment", Application

(56) References Cited

OTHER PUBLICATIONS

Research of Computer, vol. 26 No. 9, Sep. 2009, pp. 3270-3273 (Official Copy Only) (See Communication Under Rule 37 CFR § 1.98(a) (3)).

* cited by examiner

PRESENTING AN ENVIRONMENT BASED ON USER MOVEMENT

CROSS-REFERENCE TO RELATED APPLICATIONS

This application is a continuation of U.S. application Ser. No. 17/002,225, filed Aug. 25, 2020 and entitled "Presenting an Environment Based on User Movement," which claims the benefit of U.S. Provisional Application No. 62/906,667, filed Sep. 26, 2019, the entire contents of which are hereby incorporated by reference.

BACKGROUND

1. Field

The present disclosure relates generally to computer-generated reality systems, and more specifically to techniques for providing a computer-generated reality environment.

2. Description of Related Art

As the capability of electronic devices increases and their ability to output high-quality visual displays improves, applications are becoming more immersive. One such example is the increasing mainstream demand for computer-generated reality applications.

BRIEF SUMMARY

Techniques described herein can be used to provide a computer-generated reality environment and to facilitate user interactions with the computer-generated reality environment. Such techniques optionally complement or replace other methods for providing a computer-generated reality environment. Such techniques can improve the user experience and enable computer-generated reality interfaces (e.g., 3D interfaces) with advanced functionality.

In some embodiments, a computer-generated reality environment comprising a virtual object is presented (e.g., via a display device) and user movement that occurs in a physical environment is detected (e.g., via one or more sensors). In response to determining that the detected user movement is toward the virtual object and that the virtual object obstructs a real object from the physical environment, a determination is made whether the detected user movement is directed to the virtual object or the real object. In accordance with a determination that the detected user movement is directed to the real object, a visual appearance of the virtual object is modified, where modifying the visual appearance of the virtual object comprises displaying presenting at least a portion of the real object. In accordance with a determination that the detected user movement is directed to the virtual object, the presentation of the virtual object is maintained to obstruct the real object.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, an electronic device includes a display device, one or more sensors, one or more processors, and memory storing one or more programs configured to be executed by the one or more processors, the one or more programs including instructions for: presenting, via the display device, a computer-generated reality environment comprising a virtual object; detecting, via the one or more sensors, user movement that occurs in a physical environment; and in response to determining that the detected user movement is toward the virtual object and that the virtual object obstructs a real object from the physical environment: determining whether the detected user movement is directed to the virtual object or the real object; in accordance with a determination that the detected user movement is directed to the real object, modifying a visual appearance of the virtual object, wherein modifying the visual appearance of the virtual object comprises displaying presenting at least a portion of the real object; and in accordance with a determination that the detected user movement is directed to the virtual object, maintaining the presentation of the virtual object to obstruct the real object.

In some embodiments, an electronic device includes: means for presenting a computer-generated reality environment comprising a virtual object; means for detecting user movement that occurs in a physical environment; and means for, in response to determining that the detected user movement is toward the virtual object and that the virtual object obstructs a real object from the physical environment: determining whether the detected user movement is directed to the virtual object or the real object; in accordance with a determination that the detected user movement is directed to the real object, modifying a visual appearance of the virtual object, wherein modifying the visual appearance of the virtual object comprises displaying presenting at least a portion of the real object; and in accordance with a determination that the detected user movement is directed to the virtual object, maintaining the presentation of the virtual object to obstruct the real object.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
FIGS. 1A-1B depict exemplary systems for use in various computer-generated reality technologies.
Figure 1A:
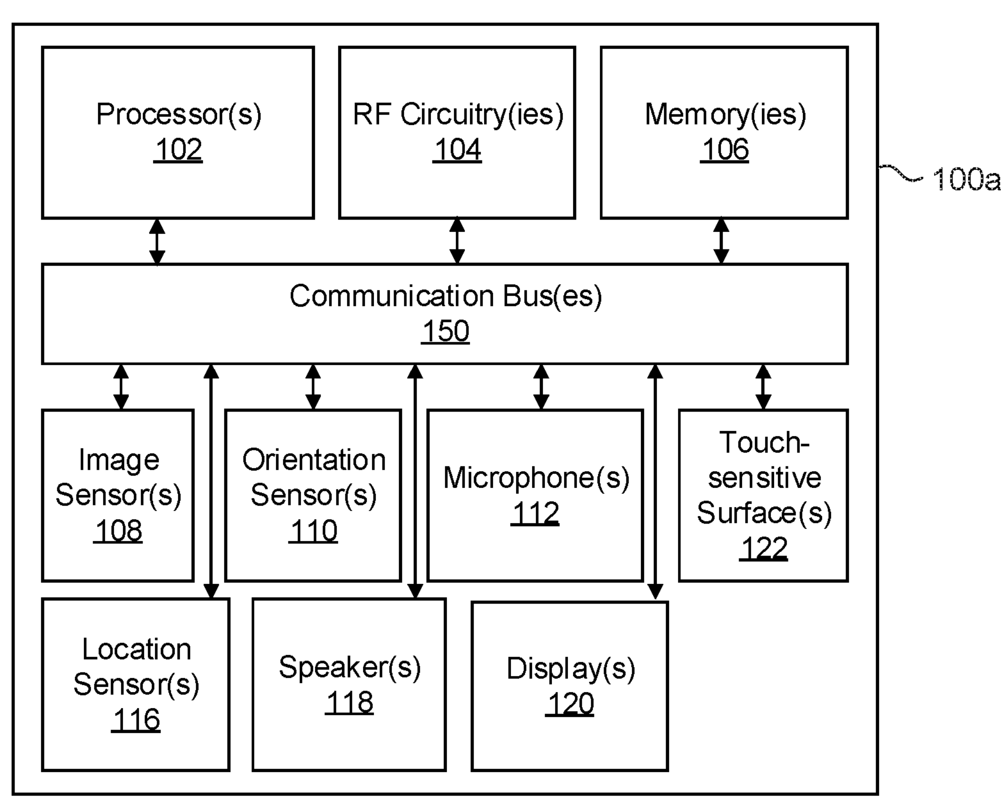

The following description sets forth exemplary methods, parameters, and the like. Such description is not intended as a limitation on the scope of the present disclosure but is instead provided as a description of exemplary embodiments.

Various embodiments of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual Objects to interact with real objects (that is, physical articles from the physical environment or representations thereof). For example, a system may account for movements so that a virtual tree appears stationary with respect to the physical ground.

Examples of MR include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
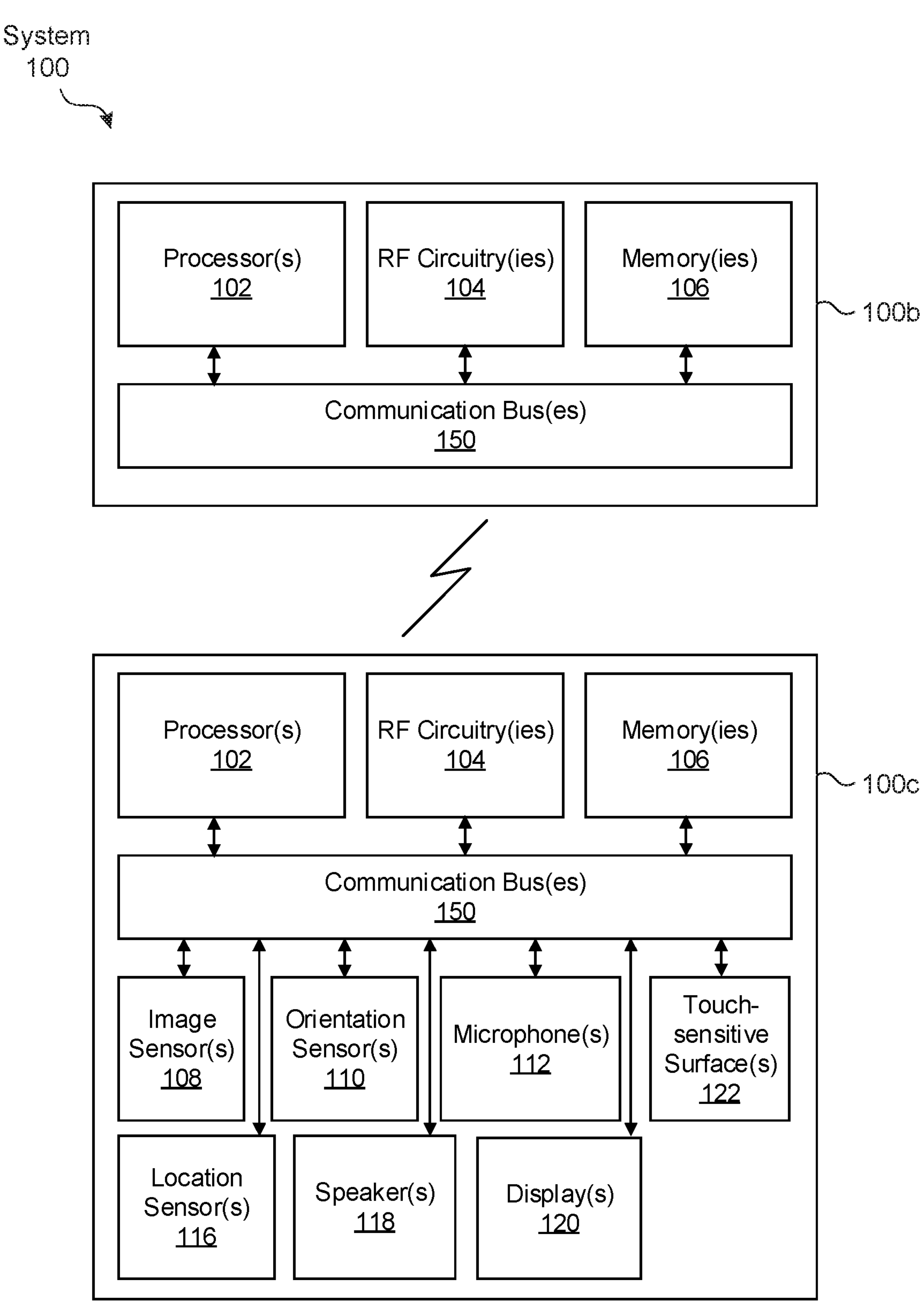

FIG. 1A and FIG. 1B depict exemplary system 100 for use in various computer-generated reality technologies.

In some embodiments, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where device 200 is in communication with the base station device. In some embodiments, device 100*a* is implemented in a base station device or a HMD device.

As illustrated in FIG. 1B, in some embodiments, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference now to FIGS. 2-10, exemplary techniques for providing a CGR environment are described.

Figure 2:
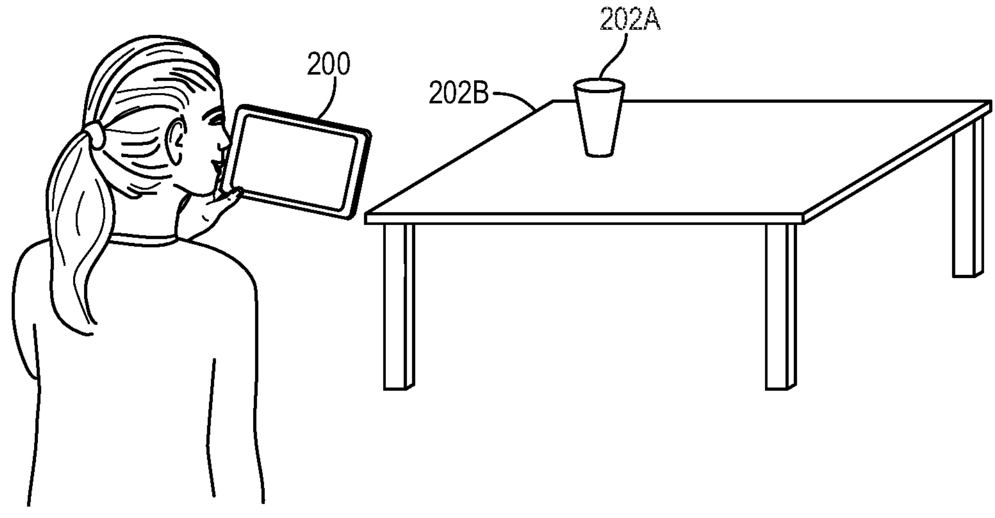
FIG. 2 depicts an exemplary physical environment.

FIG. 2 depicts a physical environment in which a user is using (e.g., holding or wearing) a device 200. In some embodiments, the device is an embodiment of system 100, or can be an embodiment of a portion of system 100 such as device 100*a*. In the embodiment illustrated in FIG. 2, device 200 is a handheld device (e.g., a tablet) that includes a display with which the user may view the physical environment (e.g., with pass-through video). Device 200 is configured to present virtual objects on the display, so that the user perceives the virtual objects superimposed over the physical environment. In some embodiments, a second device (e.g., an external display) can be connected to device 200 to provide processing and/or presentation capabilities.

FIG. 2 depicts cup 202A and table 202B, both of which are physical objects in the physical environment. As discussed below with respect to FIGS. 3-10, a user interacts with a CGR environment, which includes both real objects (or representations thereof) and virtual objects.

Figure 3:
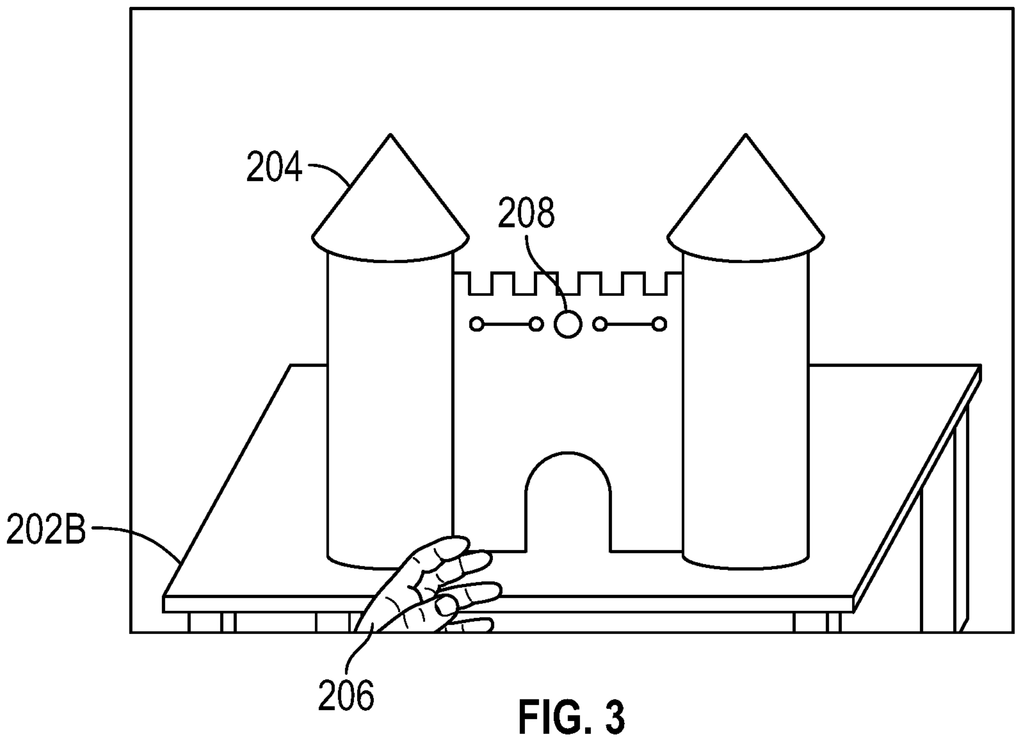
FIG. 3 depicts an exemplary computer-generated reality environment, according to some embodiments.

FIG. 3 depicts a CGR environment from the perspective of the user using device 200. As shown in FIG. 3, device 200 presents (e.g., displays) virtual castle 204 superimposed on table 202B such that virtual castle 204 appears to be resting on table 202B in front of cup 202A. In some embodiments, virtual castle 204 is a computer-generated object that does not have a counterpart in the physical environment. In embodiments incorporating pass-through video, the CGR environment includes a representation of table 202B that is generated using captured images of the physical environment.

Virtual castle 204 is opaque and located in front of cup 202A from the perspective of the user. In embodiments incorporating pass-through video, device 200 displays virtual castle 204 without displaying a representation of cup 202A that would be generated using captured images of the physical environment if it were not obscured by virtual castle 204. Thus, the user is unable to see cup 202A (or a representation of cup 202A in the case of pass-through video).

Figure 4:
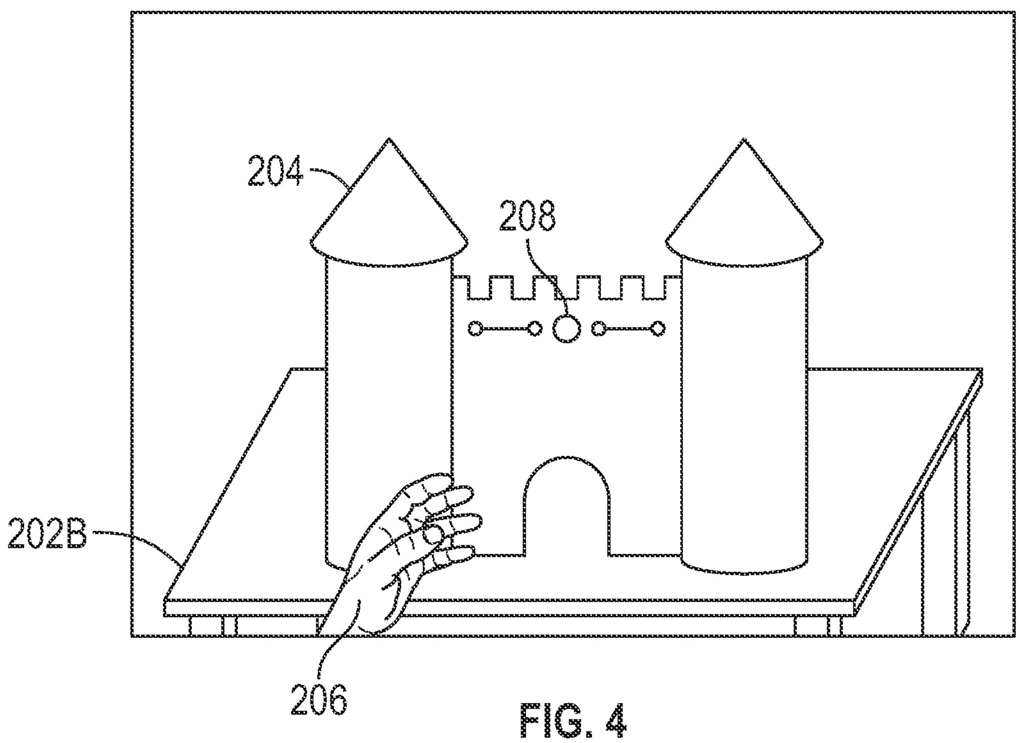
FIG. 4 depicts an exemplary computer-generated reality environment, according to some embodiments.

In the embodiment depicted in FIGS. 3-4, despite not being able to see cup 202A in the CGR environment, the user is aware of the general location of cup 202A (e.g., because the user placed it in the location shown in FIG. 2) and begins to reach for cup 202A in the physical environment with hand 206.

As the user reaches for cup 202A, device 200 detects the movement of the user using image sensor(s) (e.g., 108). For example, device 200 obtains information about hand 206 using the image sensor(s) by capturing images of the physical environment as hand 206 moves towards cup 202A in the physical environment. In some embodiments, the image sensor(s) are located at device 200, at a device external to device 200, or a combination thereof.

In response to detecting movement of the user, device 200 determines that the detected user movement is toward virtual castle 204 (e.g., since virtual castle 204 is between the user and cup 202A). In some embodiments, device 200 determines that virtual castle 204 obstructs physical cup 202A (e.g., in addition to determining that the detected user movement is toward virtual castle 204).

With reference to FIG. 4, as the user initially reaches forward, it can be unclear what the user is reaching for. For example, the user could be reaching for virtual castle 204, cup 202A, some other object, or nothing in particular. Using the information about the CGR environment, information obtained about the user movement (e.g., the pose, position, velocity, acceleration, etc. of hand 206), and/or information obtained about the user (e.g., gaze, pupillometry, previous user behavior), device 200 determines how to present (e.g., modify) the CGR environment in a manner that is consistent with the likely intent of the user (e.g., based on whether the detected user movement is directed to virtual castle 204 or cup 202A).

As discussed below, various conditions can be used to determine how to present the CRG environment. The condition(s) can be based on one or more factors, such as distance, pose, gaze, speed, or pupillometry. In some embodiments, a level of certainty is determined with respect to whether the detected user movement is directed to virtual castle 204 or cup 202A. For example, if one condition is determined to have been met that is consistent with user movement directed to a particular object, some level of certainty is assigned to the movement being directed to that object. In contrast, if multiple conditions are determined to have been met that are consistent with user movement directed to a particular object, a higher level of certainty is assigned to the movement being directed to that object. In some embodiments, a device external to device 200, such as a base station device in communication with device 200, determines the level of certainty assigned to a movement being directed to an object.

In some embodiments, device 200 presents the CGR environment based on a distance between the user (e.g., 206) and the virtual object (e.g., 204). For example, device 200 determines whether the distance between the user and a reference point (e.g., the position of a virtual object or a real object) exceeds a threshold (e.g., non-zero) distance. If the distance exceeds the threshold distance (e.g., the user's hand is far from the virtual object or the real object), device 200 determines that the user movement is not directed to the physical object located behind the virtual object (e.g., device 200 assigns a relatively low level of certainty to the movement being directed to the physical object). In contrast, if the distance does not exceed the threshold distance (e.g., the user's hand is close to the virtual object or the real object), device 200 determines that the user movement is directed to the physical object located behind the virtual object (e.g., device 200 assigns a relatively high level of certainty to the user movement being directed to the physical object).

Returning to FIG. 4, in response to detecting movement of the user, device 200 determines that the distance between hand 206 and virtual castle 204 or cup 202A exceeds the threshold distance (e.g., there is a low level of certainty that the user movement is directed to cup 202A). In some embodiments, in accordance with this determination, device 200 maintains the visual appearance of virtual castle 204. For example, device 200 does not change the opacity level of virtual castle 204. Thus, virtual castle 204 remains opaque, and the user is still unable to see cup 202A (e.g., device 200 continues to forgo displaying a representation of cup 202A in embodiments incorporating pass-through video).

Figure 5:
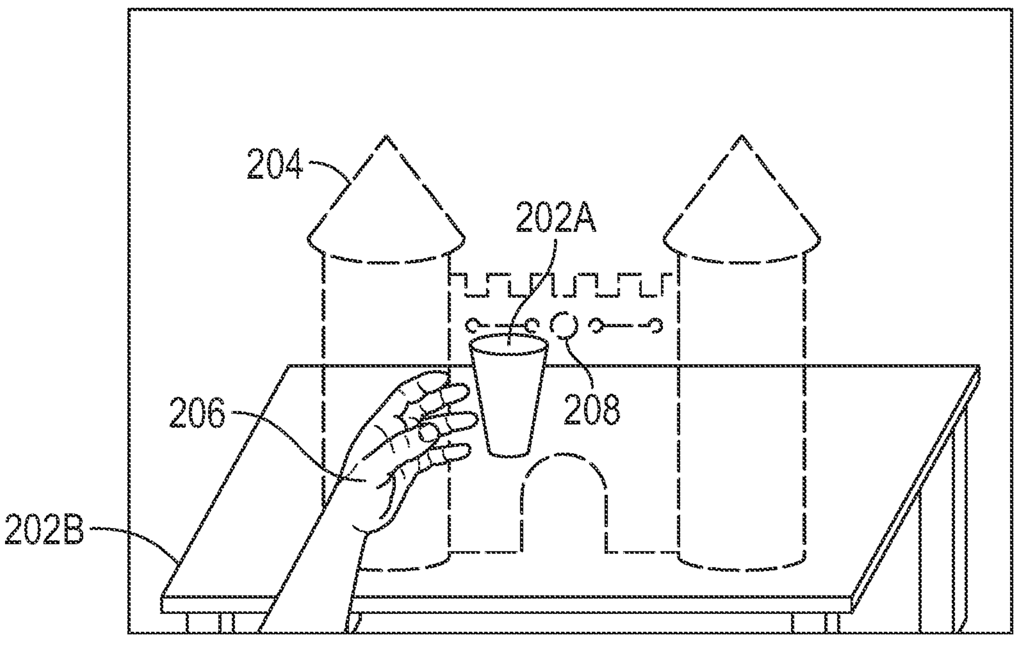
FIG. 5 depicts an exemplary computer-generated reality environment, according to some embodiments.

At FIG. 5, the user continues to move hand 206 toward virtual castle 204. As the user moves hand 206 closer to virtual castle 204, device 200 continues to capture information about hand 206 using the image sensor(s). In response to detecting movement of the user, device 200 updates its determination as to whether the detected user movement is directed to virtual castle 204 or cup 202A. For example, device 200 determines whether the distance between hand 206 and virtual castle 204 or cup 202A exceeds the threshold distance. Upon determining that the distance does not exceed the threshold distance, device 200 changes the visual appearance of virtual castle 204, as indicated by the dotted outline of virtual castle 204. Device 200 modifies the visual appearance by lowering the opacity level of all or a portion of virtual castle 204 from an initial value (e.g., 100%) to a final value (e.g., 25%, 50%, 75%). It is noted that the dotted outline in virtual castle 204 of FIG. 5 represents a lowered opacity level, resulting in virtual castle 204 becoming transparent.

In some embodiments, device 200 changes the visual appearance of virtual castle 204 at least partially in accordance with a determination that a pose corresponds to cup 202A. For example, in the embodiment illustrated in FIG. 5, hand 206 is curled in the shape of cup 202A and positioned in a similar orientation, which indicates that the movement is directed to cup 202A (e.g., increases the level of certainty that the movement is directed to cup 202A).

In some embodiments, the visual appearance of a virtual object can be modified using techniques other than changing the opacity level. For example, modifying the visual appearance can include one or more of: obliterating the virtual object or a portion thereof, applying a dissolve pattern to the virtual object or a portion thereof, or applying a dithering pattern to the virtual object or a portion thereof. For example, modifying the visual appearance of virtual castle 204 can include ceasing to display a cylindrical portion of virtual castle 204 such that a hole appears, thereby allowing the user to see cup 202A behind virtual castle 204.

Returning to FIG. 5, with hand 206 being in close proximity to virtual castle 204 or cup 202A, device 200 has lowered the opacity level in case the user movement is actually directed to cup 202A rather than virtual castle 204. As a result, the user can easily reach for cup 202A, since the user can see cup 202A due to the lowered opacity level of virtual castle 204.

Figure 6:
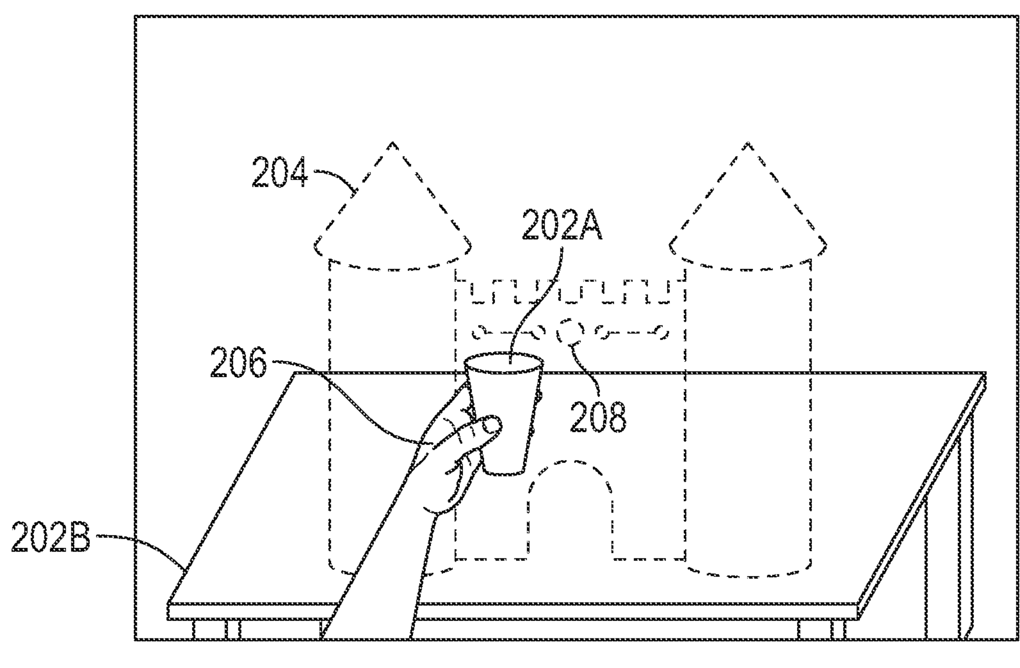
FIG. 6 depicts an exemplary computer-generated reality environment, according to some embodiments.

At FIG. 6, the user continues to reach forward past the front façade of virtual castle 204. As the user moves hand 206 past virtual castle 204 to grab cup 202A, device 200 determines with a greater level of certainty that the user movement is directed to cup 202A. In some embodiments, device 200 determines that the user movement is likely directed to cup 202A upon detecting that hand 206 has traveled past a portion of virtual castle 204. As a result, device 200 further lowers the opacity level of virtual castle 204, as depicted by the dotted outline in FIG. 6. It is noted that the dotted outline in virtual castle 204 of FIG. 6 represents an opacity level lower than that of virtual castle 204 in FIG. 5.

As depicted in FIGS. 5-6, device 200 modifies the visual appearance of virtual castle 204 in accordance with the level of certainty in the determination of the object to which the user movement is directed. At FIG. 5, device 200 determines with a low level of certainty (e.g., 15%, 30%, 45%) that the user movement is directed to cup 202A. As a result, device 200 lowers the opacity level of virtual castle 204 to a first opacity level (e.g., 95%, 80%, 65%). At FIG. 6, device 200 determines with a high level of certainty (e.g., 65%, 80%, 95%) that the user movement is directed to cup 202A. As a result, device 200 further lowers the opacity level of virtual castle 204 to a second opacity level (e.g., 45%, 30%, 15%). In some embodiments, the level of certainty in the determination does not affect the visual appearance of the virtual object (e.g., 204). For example, in some embodiments, when the visual appearance of the virtual object changes, the opacity level changes to a predetermined level regardless of the level of certainty.

Figure 7:
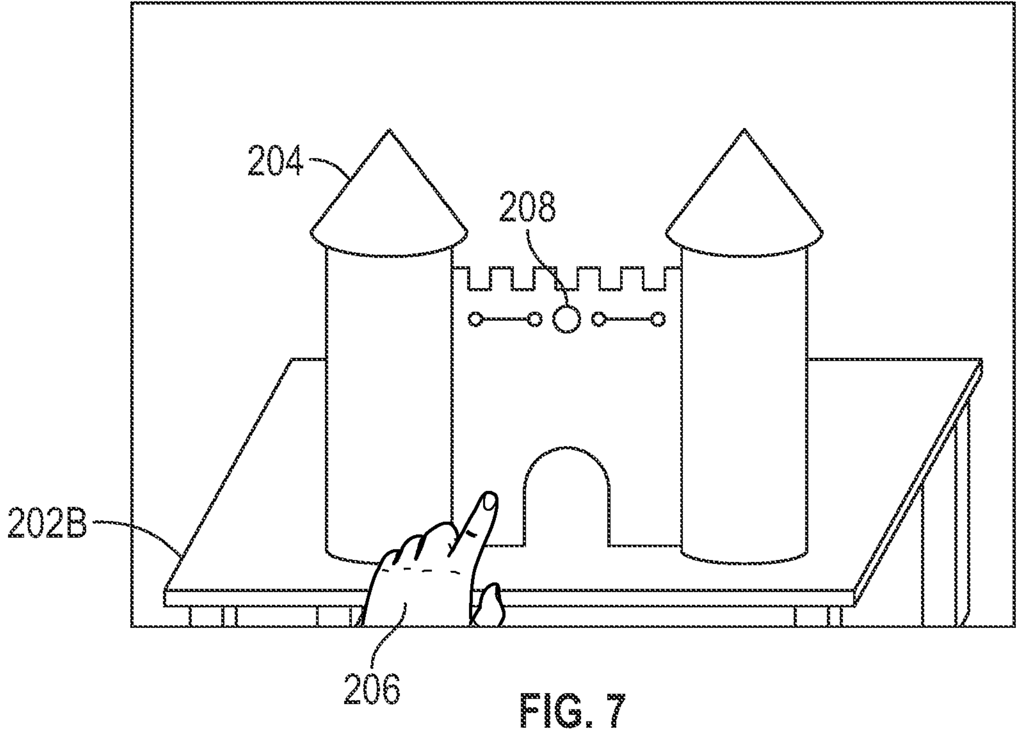
FIG. 7 depicts an exemplary computer-generated reality environment, according to some embodiments.

FIGS. 7-10 illustrate an exemplary presentation of a CGR environment based on a user movement. Similar to FIG. 3, FIG. 7 depicts the perspective of the user wearing a HMD device in the CGR environment, where virtual castle 204 is opaque and located in front of cup 200B, thereby preventing the user from being able to see cup 202A. In contrast to FIG. 3, the user has a different pose (e.g., position, orientation, or configuration of a hand, face, body, etc.). For example, in the embodiment illustrated in FIG. 7, hand 206 is oriented with palm down and index finger extended, whereas in FIG. 7, hand 206 is oriented with palm facing sideways and fingers in a curled position.

Figure 8:
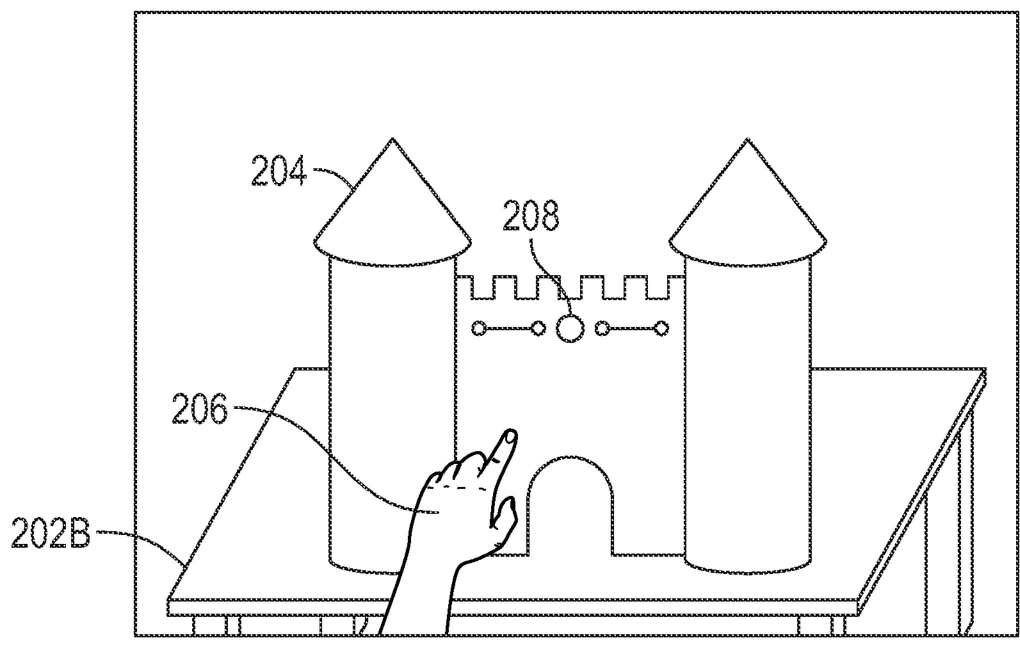
FIG. 8 depicts an exemplary computer-generated reality environment, according to some embodiments.

At FIG. 8, the user reaches toward virtual castle 204. Device 200 detects the movement of the user using the image sensor(s). In response to detecting movement of the user, device 200 determines that the user movement is toward virtual castle 204. In some embodiments, device 200 determines that virtual castle 204 obstructs cup 202A.

Using information obtained about hand 206 using the image sensor(s), device 200 determines the pose of hand 206. With the pose of hand 206, device 200 determines whether the pose corresponds to the features of a nearby object (e.g., a physical or virtual object within a threshold distance (e.g., a non-zero threshold distance) of hand 206).

With reference to FIG. 8, device 200 determines that the pose of hand 206 corresponds to virtual castle 204 (e.g., instead of cup 202A). For example, device 200 determines that the pose corresponds to virtual castle 204 since virtual castle 204 has virtual button 208, which is an activatable button provided for user interaction with the virtual object, and hand 206 has an extended index finger. Device 200 obtains data showing that virtual button 208 is associated with one or more poses. For example, virtual button 208 is associated with hand pose(s) that are likely to be used for activating a button (e.g., a hand with an extended index finger, as shown in FIG. 8). Based on the obtained data, device 200 determines that the pose of hand 206 matches (e.g., within a threshold) one of these poses. As a result, device 200 determines that the user intends to interact with virtual castle 204. In some embodiments, device 200 ranks the level of correspondence of the pose of hand 206 with one or more nearby objects (e.g., objects within a threshold distance of hand 206). Device 200 determines that the object the user intends to interact with is the object with the highest level of correspondence with the hand pose.

As shown in FIG. 8, upon determining that the user movement is directed to virtual castle 204, device 200 maintains the visual appearance of virtual castle 204 (e.g., device 200 does not lower the opacity level of virtual castle 204).

Figure 9:
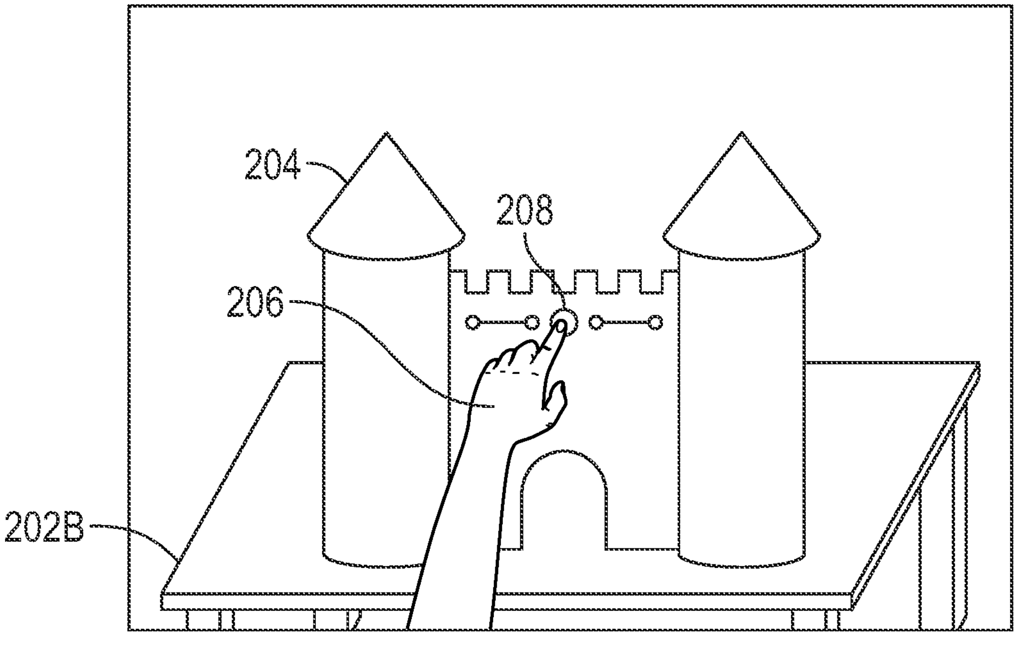
FIG. 9 depicts an exemplary computer-generated reality environment, according to some embodiments.
Figure 10:
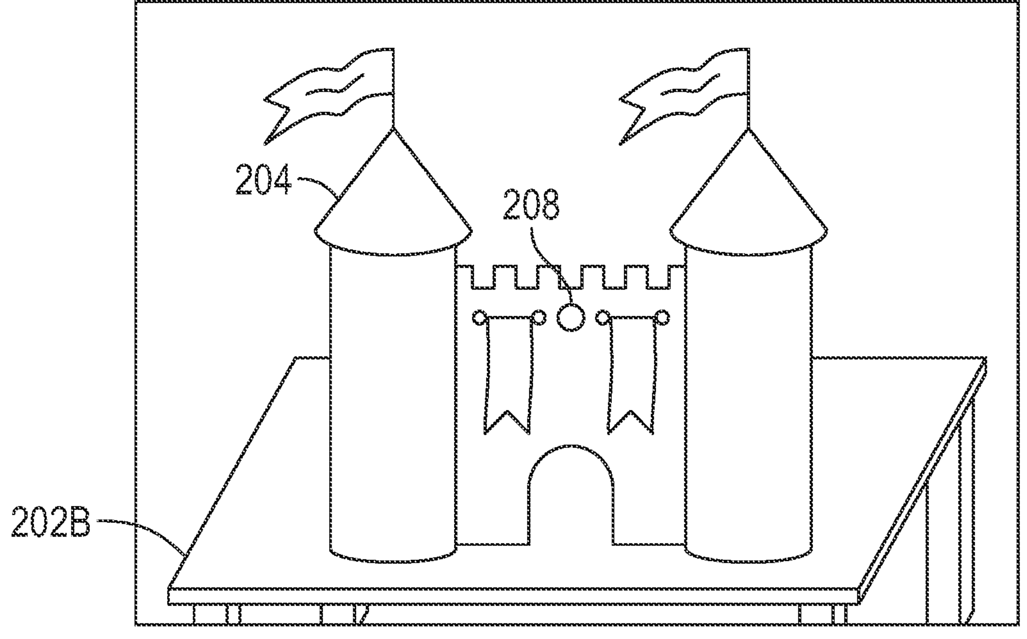
FIG. 10 depicts an exemplary computer-generated reality environment, according to some embodiments.

At FIG. 9, the user moves toward virtual castle 204 and activates virtual button 208 by positioning the index finger of hand 206 on virtual button 208. In response, device 200 modifies the presentation of virtual castle 204 to includes flags and banners, as depicted in FIG. 10. In FIGS. 7-10, device 200 maintains the opacity level of virtual castle 204 while the user moved towards virtual castle 204, as device 200 continues to determine that the user intended to interact with virtual castle 204. In some embodiments, device 200 maintains the opacity level of virtual castle 204 if the user intent is determined with a level of certainty that exceeds a predetermined threshold (e.g., 70%, 80%, 90%). In some embodiments, device 200 lowers the opacity level (e.g., by 10%) even if it is determined that the user movement is directed to virtual castle 204 (e.g., the HMD determines with a high level of certainty that the user intends to interact with virtual castle 204). In some embodiments, if the level of certainty does not exceed the predetermined threshold, device 200 modifies the visual appearance of virtual castle 204 as the user (e.g., hand 206) nears virtual castle 204, as discussed above with respect to FIGS. 4-5.

In some embodiments, in response to detecting user movement, device 200 determines whether the detected user movement is directed to virtual castle 204 or cup 202A, where the determination is based on the speed and/or acceleration associated with the user movement (e.g., based on a change in velocity, device 200 determines that hand 206 will stop moving at virtual button 208; based on a change in velocity, device 200 determines that hand 206 will move past virtual button 208 and stop at or near cup 202A). For example, with reference to FIGS. 7-8, the user moves hand 206 towards virtual castle 204. In some embodiments, in response to detecting this movement, device 200 determines whether the speed of the movement exceeds a threshold (e.g., non-zero) speed. If the speed exceeds the threshold speed, device 200 determines that the user movement is directed to cup 202A. Upon determining that the user movement is directed to cup 202A, device 200 lowers the opacity level of virtual castle 204. In contrast, if the speed does not exceed the threshold speed, device 200 determines that the user movement is directed to virtual castle 204. Upon determining that the user movement is directed to virtual castle 204, device 200 maintains the opacity level of virtual castle 204, or returns the opacity level to its full opacity level if the opacity level had previously been lowered. For example, a user may initially reach forward quickly, which causes device 200 to lower the opacity level of virtual castle 204. However, as the user nears virtual castle 204, the user slows down. As a result, device 200 raises the opacity level of virtual castle 204 to the full opacity level.

In some embodiments, in response to detecting user movement, device 200 determines whether the detected user movement is directed to virtual castle 204 or cup 202A, where the determination is based on the gaze of the user. In some embodiments, device 200 uses image sensor(s) for gaze tracking as the user moves. For example, with reference to FIGS. 7-8, the user moves hand 206 towards virtual castle 204. In some embodiments, in response to detecting the movement, device 200 determines which object the gaze is directed towards. If the gaze is directed towards cup 202A, device 200 determines that the user movement is directed to cup 202A. In contrast, if the gaze is directed towards virtual castle 204, device 200 determines that the user movement is directed to virtual castle 204.

In some embodiments, in response to detecting user movement, device 200 determines whether the detected user movement is directed to virtual castle 204 or cup 202A, where the determination is based on pupillometry (e.g., size of pupils). For example, with reference to FIGS. 7-9, the user moves hand 206 towards virtual castle 204. In some embodiments, in response to detecting the movement, device 200 determines a change in size of the pupils of the user. The size of the pupils can provide an indication that the user is close to interacting with the target object. For example, as the user nears virtual button 208, the pupils of the user can increase in size due to the expectation of activating virtual button 208. In some embodiments, device 200 determines that the user movement is directed to a nearby object (e.g., virtual castle 204) if the change in size exceeds a predetermined (e.g., non-zero) threshold. In some embodiments, if the change in size does not exceed the predetermined threshold, device 200 determines that the user is not close to an object with which the user intends to interact.

In some embodiments, device 200 can check one or more conditions (e.g., distance, pose, speed, gaze, pupillometry) for determining whether the detected user movement is directed to virtual castle 204 or cup 202A. As discussed above with respect to FIGS. 3-6, device 200 uses a distance condition to determine whether the detected user movement is directed to virtual castle 204 or cup 202A. In some embodiments, device 200 can improve the level of certainty in the determination of whether the detected user movement is directed to virtual castle 204 or cup 202A by checking other conditions. For example, at FIG. 5, device 200 optionally determines whether the pose of hand 206 corresponds to a nearby object. In some embodiments, device 200 determines that the pose of hand 206 matches (e.g., within a threshold) a pose associated with cup 202A. In some embodiments, by checking the pose in addition to distance, device 200 improves the level of certainty in its determination of whether the detected user movement is directed to virtual castle 204 or cup 202A. In some embodiments, certain conditions can be weighted more heavily in the determination of whether the detected user movement is directed to virtual castle 204 or cup 202A. For example, the pose condition can be weighted more heavily than the distance condition, or vice versa. Accordingly, if the two conditions suggest different objects, the condition that is weighted more heavily would determine to which object the user movement is directed.

Figure 11:
FIG. 11 depicts a flow chart of an exemplary process for providing a computer-generated reality environment, according to some embodiments.
Figure 11:
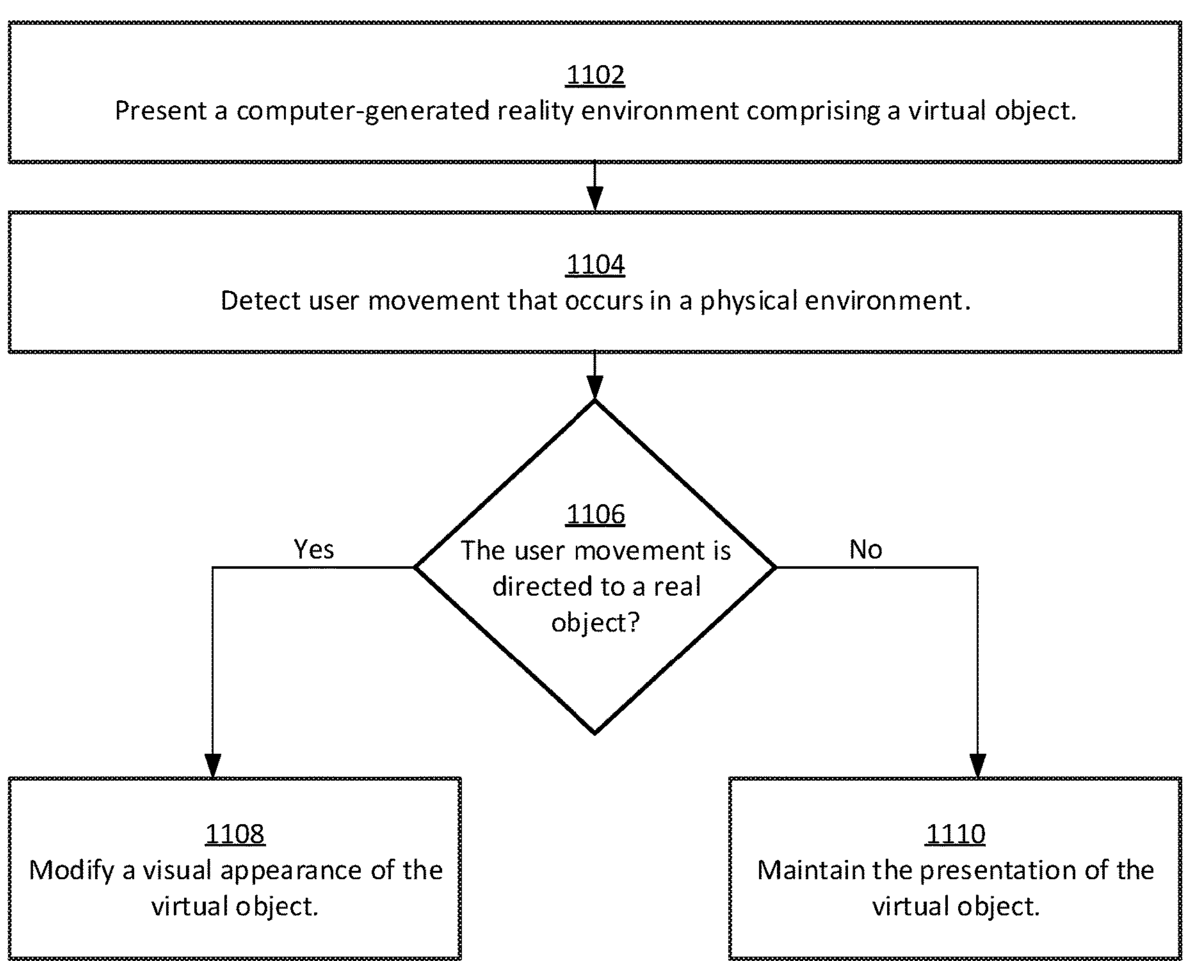

Turning now to FIG. 11, a flow chart is depicted of exemplary process 1100 for providing a CGR environment. Process 1100 can be performed using a device (e.g., 100*a*, 100*c*, or 200) with a display device and one or more sensors. Although the blocks of process 1100 are depicted in a particular order in FIG. 11, these blocks can be performed in other orders. Some operations in method 1100 are, optionally, combined, the orders of some operations are, optionally, changed, and some operations are, optionally, omitted. Further, additional operations can be performed in addition to those described in process 1100.

At block 1102, the device presents (e.g., via the display device) a CGR environment comprising a virtual object (e.g., 204). In some embodiments, the display device includes an opaque display and presenting the CGR environment includes presenting the virtual object and pass-through video of the physical environment via the opaque display. In some embodiments, the display device includes a transparent or translucent display (e.g., an additive display) through which the physical environment is directly viewable and presenting the CGR environment includes presenting the virtual object via the transparent or translucent display.

At block 1104, the device detects (e.g., via the one or more sensors) user movement (e.g., movement of hand 206) that occurs in a physical environment. In some embodiments, the device obtains data representing user movement that occurs in a physical environment. In some embodiments, the device detects (e.g., via the one or more sensors) a user pose that occurs in the physical environment or obtains data representing a user pose that occurs in the physical environment. In some embodiments, the device detects (e.g., via the one or more sensors) a user gaze or obtains data representing a user gaze.

At block 1106, the device determines whether the user movement is directed to a real object (e.g., 202A) in the physical environment (e.g., a real object that is obstructed by the virtual object in the CGR environment). In some embodiments, determining whether the user movement is directed to a real object includes determining whether the user movement is directed to the virtual object or the real object. In some embodiments, determining whether the user movement is directed to the real object (or, e.g., the virtual object) includes predicting where the detected user movement will stop. In some embodiments, determining whether the user movement is directed to the real object (or, e.g., the real object) is performed using a machine learning algorithm. For example, the device determines whether the user movement is directed to the real object based at least in part on previous user movements (e.g., previous hand poses or movement velocity).

In some embodiments, the device determines whether the user movement is directed to the real object (or, e.g., the virtual object) in response to determining that the user movement is toward the virtual object and that the virtual object obstructs the real object from the physical environment. In some embodiments, determining that the user movement is toward the virtual object includes determining that the distance between the virtual object and a location of the user movement does not exceed a threshold distance. In some embodiments, determining that the virtual object obstructs the real object from the physical environment includes determining that the virtual object at least partially overlaps the real object in the CGR environment. In some embodiments, determining that the virtual object obstructs the real object from the physical environment includes determining that the virtual object at least partially blocks a view of the real object from a user perspective of the CGR environment.

At block 1108, in accordance with a determination that the user movement is directed to the real object, the device modifies a visual appearance of the virtual object (e.g., the device changes the transparency of at least a portion of the virtual object).

In some embodiments, the determination that the user movement is directed to the real object includes a determination that the user pose corresponds to a feature of the real object (e.g., the user's hand is in a pose that matches the shape of the real object (or a portion thereof), which suggests that the user intends to grab the real object). In some embodiments, the determination that the user movement is directed to the real object includes a determination that the user pose does not correspond to a feature of the virtual object. For example, if the virtual object includes a virtual button, the pose does not correspond to a gesture a user would use to activate (e.g., push) the virtual button.

In some embodiments, the determination that the detected user movement is directed to the real object includes a determination that a speed associated with the detected user movement exceeds a threshold speed. In some embodiments, the device determines velocity and/or acceleration of the user movement over time to predict where the user movement will stop (e.g., whether the user movement will stop at the bounds of the virtual object or the real object). In some embodiments, the determination that the user movement is directed to the real object includes a determination that the detected user movement will stop closer to the real object than the virtual object (e.g., that the detected user movement will stop within the bounds of the real object). In some embodiments, the determination that the user movement is directed to the real object includes a determination that a user gaze is directed to the real object.

In some embodiments, modifying the visual appearance of the virtual object includes ceasing to present at least a portion of the virtual object. In some embodiments, modifying the visual appearance of the virtual object comprises presenting at least a portion of the real object. In embodiments with a transparent or translucent display, presenting a real object includes allowing the user to view the real object by not presenting content (e.g., a virtual object) over the real object. In some embodiments, modifying the visual appearance of the virtual object includes: in accordance with a determination that the user movement is directed to the real object with a first level of confidence, modifying the visual appearance (e.g., transparency) of the virtual object by a first magnitude; and in accordance with a determination that the user movement is directed to the real object with a second level of confidence different from the first level of confidence, modifying the visual appearance of the virtual object by a second magnitude different from the first magnitude.

At block 1110, in accordance with a determination that the user movement is not directed to the real object (e.g., a determination that the user movement is directed to the virtual object), the device maintains the presentation of the virtual object (e.g., the device maintains the presentation of the virtual object to obstruct the real object). In some embodiments, the determination that the user movement is directed to the virtual object includes a determination that a user gaze is directed to the virtual object. In some embodiments, the determination that the user movement is directed to the virtual object includes a determination that a user pose corresponds to a feature of the virtual object. In some embodiments, the determination that the user movement is directed to the virtual object includes a determination that the user pose does not correspond to a feature of the real object. In some embodiments, the determination that the user movement is directed to the virtual object includes a determination that the detected user movement will stop closer to the virtual object than the real object (e.g., that the detected user movement will stop within the bounds of the virtual object).

Executable instructions for performing the features of process 1100 described above are, optionally, included in a transitory or non-transitory computer-readable storage medium (e.g., memory(ies) 106) or other computer program product configured for execution by one or more processors (e.g., processor(s) 102).

Aspects of the techniques described above contemplate the possibility of gathering and using personal information to provide a CGR experience. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and embodiments have been fully described with reference to the accompanying drawings, it is to be noted that various changes and modifications will become apparent to those skilled in the art. Such changes and modifications are to be understood as being included within the scope of the disclosure and embodiments as defined by the claims.

What is claimed is:

1. An electronic device, comprising:

one or more processors; and memory storing one or more programs configured to be executed by the one or more processors, the one or more programs including instructions for:

presenting, via a display device, a virtual object in a respective region of a physical environment;

detecting, via one or more sensors, user movement that occurs in a physical environment, wherein the user movement includes movement towards the respective region of the physical environment;

determining that at least a portion of the virtual object in the respective region of the physical environment is presented in front of a real object in the physical environment from a perspective of a user viewing the display device; and in response to detecting the user movement and determining that at least the portion of the virtual object is presented in front of the real object in the physical environment from the perspective of the user viewing the display device:

determining whether the detected user movement is directed to the real object or the portion of the virtual object presented in front of the real object from the perspective of the user viewing the display device;

in accordance with a determination that the detected user movement is directed to the real object, modifying a visual appearance of the virtual object in the respective region of the physical environment, wherein modifying the visual appearance of the virtual object in the respective region of the physical environment comprises presenting at least a portion of the real object; and in accordance with a determination that the detected user movement is directed to the portion of the virtual object presented in front of the real object from the perspective of the user viewing the display device, maintaining the presentation of at least the portion of the virtual object in front of the real object from the perspective of the user viewing the display device.

2. The electronic device of claim 1, wherein the determination that the detected user movement is directed to the portion of the virtual object presented in front of the real object from the perspective of the user viewing the display device includes a determination that a distance between the portion of the virtual object and a location of the user movement does not exceed a threshold distance.

3. The electronic device of claim 1, wherein the one or more programs further include instructions for:

detecting, via the one or more sensors, a user pose that occurs in the physical environment, wherein the determination that the detected user movement is directed to the real object includes a determination that the detected user pose corresponds to a feature of the real object.

4. The electronic device of claim 1, wherein the one or more programs further include instructions for:

detecting, via the one or more sensors, a user pose that occurs in the physical environment, wherein the determination that the detected user movement is directed to the real object includes a determination that the detected user pose does not correspond to a feature of the virtual object.

5. The electronic device of claim 1, wherein the determination that the detected user movement is directed to the real object includes a determination that a speed associated with the detected user movement exceeds a threshold speed.

6. The electronic device of claim 1, wherein the one or more programs further include instructions for:

detecting, via the one or more sensors, a user gaze, wherein the determination that the detected user movement is directed to the real object includes a determination that the detected user gaze is directed to the real object.

7. The electronic device of claim 1, wherein modifying the visual appearance of the virtual object includes:

in accordance with a determination that the detected user movement is directed to the real object with a first level of confidence, modifying the visual appearance of the virtual object by a first magnitude; and in accordance with a determination that the detected user movement is directed to the real object with a second level of confidence different from the first level of confidence, modifying the visual appearance of the virtual object by a second magnitude different from the first magnitude.

8. The electronic device of claim 1, wherein determining whether the detected user movement is directed to the real object or the portion of the virtual object presented in front of the real object from the perspective of the user viewing the display device includes predicting where the detected user movement will stop.

9. The electronic device of claim 1, wherein modifying the visual appearance of the virtual object in the respective region of the physical environment includes ceasing to present at least a portion of the virtual object in the respective region of the physical environment.

10. The electronic device of claim 1, wherein determining whether the detected user movement is directed to the real object or the portion of the virtual object presented in front of the real object from the perspective of the user viewing the display device is performed using a machine learning algorithm.

11. A non-transitory computer-readable storage medium storing one or more programs configured to be executed by one or more processors of an electronic device, the one or more programs including instructions for:

presenting, via a display device, a virtual object in a respective region of a physical environment;

detecting, via one or more sensors, user movement that occurs in a physical environment, wherein the user movement includes movement towards the respective region of the physical environment;

determining that at least a portion of the virtual object in the respective region of the physical environment is presented in front of a real object in the physical environment from a perspective of a user viewing the display device; and in response to detecting the user movement and determining that at least the portion of the virtual object is presented in front of the real object in the physical environment from the perspective of the user viewing the display device:

determining whether the detected user movement is directed to the real object or the portion of the virtual object presented in front of the real object from the perspective of the user viewing the display device;

in accordance with a determination that the detected user movement is directed to the real object, modifying a visual appearance of the virtual object in the respective region of the physical environment, wherein modifying the visual appearance of the virtual object in the respective region of the physical environment comprises presenting at least a portion of the real object; and in accordance with a determination that the detected user movement is directed to the portion of the virtual object presented in front of the real object from the perspective of the user viewing the display device, maintaining the presentation of at least the portion of the virtual object in front of the real object from the perspective of the user viewing the display device.

12. The non-transitory computer-readable storage medium of claim 11, wherein the determination that the detected user movement is directed to the portion of the virtual object presented in front of the real object from the perspective of the user viewing the display device includes a determination that a distance between the portion of the virtual object and a location of the user movement does not exceed a threshold distance.

13. The non-transitory computer-readable storage medium of claim 11, wherein the one or more programs further include instructions for:

detecting, via the one or more sensors, a user pose that occurs in the physical environment, wherein the determination that the detected user movement is directed to the real object includes a determination that the detected user pose corresponds to a feature of the real object.

14. The non-transitory computer-readable storage medium of claim 11, wherein the one or more programs further include instructions for:

detecting, via the one or more sensors, a user pose that occurs in the physical environment, wherein the determination that the detected user movement is directed to the real object includes a determination that the detected user pose does not correspond to a feature of the virtual object.

15. The non-transitory computer-readable storage medium of claim 11, wherein the determination that the detected user movement is directed to the real object includes a determination that a speed associated with the detected user movement exceeds a threshold speed.

16. The non-transitory computer-readable storage medium of claim 11, wherein the one or more programs further include instructions for:

detecting, via the one or more sensors, a user gaze, wherein the determination that the detected user movement is directed to the real object includes a determination that the detected user gaze is directed to the real object.

17. A method, comprising:

at an electronic device with a processor, memory, a display device, and one or more sensors:

presenting, via a display device, a virtual object in a respective region of a physical environment;

detecting, via one or more sensors, user movement that occurs in a physical environment, wherein the user movement includes movement towards the respective region of the physical environment;

determining that at least a portion of the virtual object in the respective region of the physical environment is presented in front of a real object in the physical environment from a perspective of a user viewing the display device; and in response to detecting the user movement and determining that at least the portion of the virtual object is presented in front of the real object in the physical environment from the perspective of the user viewing the display device:

determining whether the detected user movement is directed to the real object or the portion of the virtual object presented in front of the real object from the perspective of the user viewing the display device;

in accordance with a determination that the detected user movement is directed to the real object, modifying a visual appearance of the virtual object in the respective region of the physical environment, wherein modifying the visual appearance of the virtual object in the respective region of the physical environment comprises presenting at least a portion of the real object; and in accordance with a determination that the detected user movement is directed to the portion of the virtual object presented in front of the real object from the perspective of the user viewing the display device, maintaining the presentation of at least the portion of the virtual object in front of the real object from the perspective of the user viewing the display device.

18. The method of claim 17, wherein the determination that the detected user movement is directed to the virtual object includes a determination, by the electronic device, that a distance between the virtual object and a location of the user movement does not exceed a threshold distance.

19. The method of claim 17, further comprising:

detecting, via the one or more sensors, a user pose that occurs in the physical environment, wherein the determination that the detected user movement is directed to the real object includes a determination, by the electronic device, that the detected user pose corresponds to a feature of the real object.

20. The method of claim 17, further comprising:

detecting, via the one or more sensors, a user pose that occurs in the physical environment, wherein the determination that the detected user movement is directed to the real object includes a determination, by the electronic device, that the detected user pose does not correspond to a feature of the virtual object.

21. The method of claim 17, wherein the determination that the detected user movement is directed to the real object includes a determination, by the electronic device, that a speed associated with the detected user movement exceeds a threshold speed.

22. The method of claim 17, further comprising:

detecting, via the one or more sensors, a user gaze, wherein the determination that the detected user movement is directed to the real object includes a determination, by the electronic device, that the detected user gaze is directed to the real object.

* * * * *